United States Patent
Morimoto et al.

(10) Patent No.: US 6,487,366 B1
(45) Date of Patent: Nov. 26, 2002

(54) CAMERA SYSTEM CAPABLE OF STORING COMPRESSED DATA

(75) Inventors: Yasuhiro Morimoto, Takatsuki (JP); Hisanori Itoh, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/366,372

(22) Filed: Dec. 29, 1994

Related U.S. Application Data (63) Continuation of application No. 08/097,863, filed on Jul. 26, 1993, now abandoned, which is a continuation of application No. 07/655,670, filed on Feb. 14, 1991, now abandoned.

(30) Foreign Application Priority Data

| Feb. 16, 1990 | (JP) | ............................................... | 2-36835 |
| Mar. 5, 1990 | (JP) | ............................................... | 2-52975 |

(51) Int. Cl.[7] ............................ H04N 5/92; H04N 5/225
(52) U.S. Cl. ..................... 386/117; 386/46; 386/109; 348/207; 348/333.01
(58) Field of Search ................................. 358/335, 310, 358/906, 909.1; 348/207, 231, 233, 333, 335, 340, 341, 344; 360/33.1, 35.1; 386/46, 117, 38, 109; H04N 5/76, 5/78, 5/781, 5/782, 5/783, 9/79, 5/225

(56) References Cited

U.S. PATENT DOCUMENTS

| 4,691,253 A | * | 9/1987 | Silver ........................... 358/312 |
| 4,837,628 A | | 6/1989 | Sasaki ........................... 358/209 |
| 4,887,161 A | * | 12/1989 | Watanabe et al. ............ 358/909 |
| 4,907,231 A | | 3/1990 | Watanabe et al. .............. 371/24 |
| 4,972,265 A | * | 11/1990 | Tanaka et al. ........... 348/333.08 |
| 5,018,017 A | | 5/1991 | Sasaki et al. ................. 358/209 |
| 5,027,214 A | * | 6/1991 | Fujimori ....................... 358/909 |
| 5,032,927 A | * | 7/1991 | Watanabe et al. ............ 358/335 |
| 5,040,068 A | * | 8/1991 | Parulski et al. .............. 358/335 |
| 5,060,069 A | * | 10/1991 | Aoki ........................... 358/909 |
| 5,065,246 A | * | 11/1991 | Takomoto et al. ........... 358/909 |
| 5,068,744 A | * | 11/1991 | Ito ............................... 358/335 |
| 5,091,787 A | * | 2/1992 | Watanabe et al. ............ 358/906 |
| 5,153,729 A | * | 10/1992 | Saito ............................ 358/909 |
| 5,200,863 A | * | 4/1993 | Orii ............................ 360/33.1 |
| 5,418,926 A | * | 5/1995 | Horii et al. ............... 358/909.1 |

FOREIGN PATENT DOCUMENTS

| JP | 63-286078 | 11/1988 |
| JP | 63-286837 | 11/1988 |
| JP | 64-41582 | 2/1989 |
| JP | 64-55979 | 2/1989 |
| JP | 1-165267 | 6/1989 |
| JP | 1-278183 | 8/1989 |
| JP | 2-248174 | 10/1990 |

* cited by examiner

*Primary Examiner*—Thai Tran
(74) *Attorney, Agent, or Firm*—Sidley Austin; Brown & Wood LLP (57) ABSTRACT

A camera includes an image sensor for sensing an image of an object to be photographed and producing an image data, a first memory for storing information concerning compression, a setting device for setting a compression ratio based on the information stored in the first memory, a compression device for compressing the image data at the set compression ratio, and a second memory for storing the compressed image data. Also, This camera includes a displaying device for displaying an image corresponding to the compressed image data in the viewfinder system so that the photographer can observe the image quality deterioration caused by the compression.

35 Claims, 6 Drawing Sheets

CAMERA SYSTEM CAPABLE OF STORING COMPRESSED DATA

This application is a continuation of application Ser. No. 08/097,863 filed Jul. 26, 1993 now abandoned, which, in turn, is a continuation of application Ser. No. 07/655,670, filed Feb. 14, 1991, now abandoned.

BACKGROUND OF THE INVENTION AND RELATED ART STATEMENT

This invention relates to a camera system capable of compressing a photographed image data and then storing the compressed image data in a memory.

To increase the S/N ratio of image data, and reduce the size of camera, it has been required that image data is converted into the form of a digital signal and stored in a semiconductor memory. For example, Japanese Unexamined Patent Publication No. 59-183582 discloses an image storing method in which an output of a image pick-up device is A/D-converted into a digital image signal, and the digital image signal is stored in a semiconductor memory, e.g., SRAM, provided in a memory card detachably attached to a camera body.

However, the market price of semiconductor memories is remarkably high. Also, the semiconductor memories have a small storage capacity and cannot store a sufficient number of image data. To overcome these drawbacks, signal compression has been practiced of compressing image data before storing in a semiconductor memory. However, this signal compression raises another problem that a camera photographer cannot observe the image quality deterioration caused by the signal compression until the stored image is reproduced.

Japanese Unexamined Patent Publication No. 1-165267 discloses an electronic still camera which makes it possible that before storing a photographed image data, the photographer can check whether the photographed image data is suitable for photographer's purpose. In this electronic still camera, however, the checked image data is a photographed image data itself, and not a compressed image data. Accordingly, in the electronic still camera of Japanese Unexamined Patent Publication No. 1-165267, the photographer cannot observe the image quality deterioration caused by the signal compression.

Also, Japanese Unexamined Patent Publication No. 63-286078 discloses a digital image data storing method which enables the photographer to select one among a compression mode and a non-compression mode to store image data in a memory card with high efficiency.

There are many kinds of memory card having different storage capacities. For example, in a case that one frame of still image has an information content of 200 Kbytes, a 128 Kbyte memory card cannot store even one frame of still image, and also 1 Mbyte memory card cannot store more than five frames. Accordingly, it could be seen that the 128 Kbyte memory card cannot be used unless the image data is compressed before stored.

It is a great inconvenience that the storability of a memory card is determined by the storage capacity of the memory card. As mentioned above, also, there are memory cards having different storage capacities. Accordingly, it could be seen that the storage capacity of a memory card cannot be utilized only by changing from the compression mode to the non-compression mode and vice versa. Also, this will place the photographer in a state that the memory card cannot be relied on.

Accordingly, it is an object of the present invention to provide a camera which has overcome the above-mentioned drawbacks.

It is another object of the present invention to provide a camera which makes it possible that the photographer can observe a compressed image data before storing.

It is still another object of the present invention to provide a camera which makes it possible to set a proper compression ratio in accordance with the storage capacity of a memory card and photographer's purpose.

SUMMARY OF THE INVENTION

According to the present invention, a camera comprises image sensing means for sensing an image of an object to be photographed and producing an image data, first storing means for storing information concerning compression, setting means for setting a compression ratio based on the information stored in said first storing means, compression means for compressing the image data at the set compression ratio, and second storing means for storing the compressed image data.

Also, according to the present invention, an image storing medium comprises first storing means for storing data representative of an image, and second storing means for storing information which is used for compressing the data to be stored in said first storing means.

Further, according to the present invention, a camera system comprises a camera main body, image sensing means provided in said camera main body for sensing an image of an object to be photographed and producing an image data, a storing medium detachably attached to the camera main body and including first storing means for storing information concerning compression and second storing means for storing compressed image data, readout means for reading out the information stored in said first storing means, setting means for setting a compression ratio based on the information read out by said readout means, and compression means for compressing the image data at the set compression ratio.

Furthermore, according to the present invention, a photographing apparatus comprises image sensing means for sensing an image of an object to be photographed and producing an image data, processing means for processing the image data, first storing means for storing the image data processed by said processing means, second storing means for storing information concerning processing to be accomplished by said processing means, readout means for reading out the information stored in said second storing means, and controller means for controlling said processing means so as to process the image data in accordance with the information read out by said readout means, and controlling said first storing means so as to store the processed image data.

Moreover, according to the present invention, a camera comprises image sensing means for sensing an image of an object to be photographed and producing an image data, compression means for compressing the image data, setting means for setting a compression ratio for said compression means, displaying means for displaying an image representative of the compressed image data, and storing means for storing the compressed image data.

These and other objects, features and advantages of the present invention will become more apparent upon a reading of the following detailed description and drawings.

DETAILED DESCRIPTION OF PREFERRED EMBODIMENTS OF THE INVENTION

Still video cameras embodying the present invention will be described with reference to the accompanying drawings.

Figure 1:
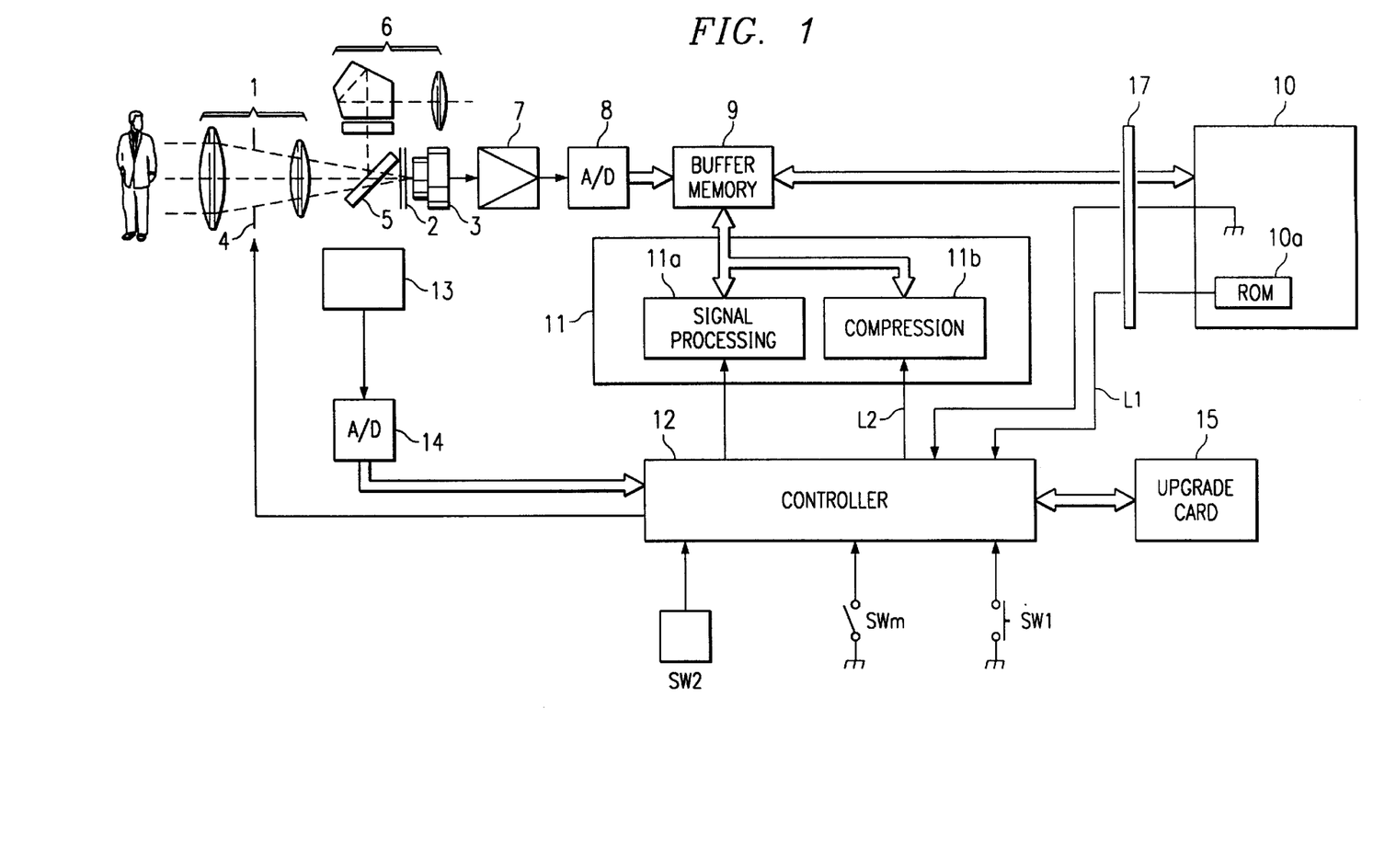
FIG. 1 is a block diagram showing an overall construction of a first still video camera of the present invention.

FIG. 1 diagrammatically shows an overall construction of a first still video camera. This camera employs a solid-state memory as a memory for storing photographed image data. A photographic optical system of the camera includes a photographic lens 1, a mechanical shutter 2, an image pick-up device 3, and a diaphragm 4. When the shutter 2 is opened, the light from a subject passes through the photographic lens 1 to the image pick-up device 3. In the usual time when exposure is not practiced, the light passing through the photographic lens 1 is directed to a viewfinder optical system 6 by a mirror 5 so that the photographer can observe the field of view.

A storing portion of the camera includes an amplifier 7 for amplifying an output from the image pick-up device 3, an A/D converter 8 for converting the analog output to a digital image signal, a buffer memory 9 for temporarily storing the converted image signal, a digital processing circuit 11 for processing the image signal to produce image data, and a memory card 10 for storing the image data. The digital processing circuit 11 includes a signal processing circuit 11a and a signal compression circuit 11b. The memory card 10 carries an image memory, such as SRAM, and is removably mounted in the camera body by a way off a connector 17. Also, there is provided a controller 12 for controlling all the operations of the camera systematically.

Further, the camera is provided with a light measuring device 13 for measuring the brightness of the subject for exposure control. An output of the light measuring device 13 is converted to a digital signal by an A/D converter 14, and sent to the controller 12. Based on this signal, the system controller 12 controls the diaphragm 4.

To the controller 12 is connected a main switch SWm, a release switch SW1, a compression mode selection switch SW2 for selecting an appropriate one from a plurality of compression modes including non-compression mode. Also, a function upgrade card 15 is connectable to the controller 12. The function upgrade card 15 is removably mounted in the camera body.

The memory card 10 carries, in addition to the image memory for storing image data, a ROM 10a holding information concerning the storage capacity of the image memory. This information is to be used to compress an image signal. Specifically, when the memory card 10 is mounted in the camera body and then connected to the controller 12 through a connecter 17, or when the main switch SWm is turned on, the controller 12 is connected to the memory card 10 having already mounted in the camera body, the controller 12 reads the storage capacity information from the ROM 10a as well as information concerning the remaining capacity of the memory card 10, the type of the memory card 10, and other items.

The storage capacity information is sent from the ROM 10a to the controller 12 via a signal line L1. The controller 12 calculates an appropriate compression ratio based on the read storage capacity information. The calculated compression ratio is sent to the compression circuit 11b of the digital processing circuit 11. The compression circuit 11a compresses the digital image signal in accordance with the sent compression ratio. The compression ratio is calculated in accordance with a predefined equation, or retrieved from a compression ratio table which is prepared in advance.

A principal routine of operations of the camera will be described later. The main switch SWm is first turned on. Thereafter, when the release switch SW1 is turned on, the controller 12 calculates an exposure value based on brightness data which is obtained by A/D converting an output of the light measuring device 13 with the A/D converter 14, and then determines an aperture value of the diaphragm 4. Subsequently, the mirror 5 is flipped up and the shutter 2 is opened for a predetermined period of time.

After the shutter 2 is closed, an output of the image pick-up device 3, a photoelectrically converted charge, is transferred to the amplifier 7 in synchronism with a clock signal fed by a timing generator (not illustrated), and amplified by the amplifier 7, and converted to a digital signal by the A/D converter 8, and stored in the buffer memory 9.

The stored image signal is sent to the signal processing circuit 11a in which color separation, gamma correction, white balance adjustment, and matrix processing are practiced to produce Y, R-Y, and B-Y signals. These processed signals are sent to the compression circuit 11b in which then compressed. The compressed image signal is stored in an image memory of the memory card 10 through the buffer memory 9. It should be noted that the memory medium for image data is not limited to a memory card, but other memory mediums may be used.

In the course of executing photography, an appropriate mode is selected out of a plurality of compression modes by the compression mode selection switch SW2. The controller 12 determines a compression ratio or compression way in accordance with the selected compression mode and image storage information sent from the ROM, 10a of the memory card 10.

Before storing in the image memory of the memory card 10 the image data which has been stored in the buffer memory 9 after compressed as mentioned above, an image equivalent to the image data is displayed in the viewfinder optical system 6 so that the photographer can check the image corresponding to the selected compression ratio and compression way. The photographer selects a compression ratio or compression way most suited to his photographic purpose while examining the image quality deterioration caused the compression.

It is preferable that in initial time, the compression mode is made to automatically set in a predetermined mode. Such initially set mode may be one most suitable for the storage capacity of a mounted memory card, or the photographic information of a mounted function upgrade card 15. A function upgrade card 15 is a card which is removably mountable in the camera body in accordance with photographer's intention, and automatically sets a shutter speed and diaphragm diameter suitable for the photographer's intention.

Figure 2:
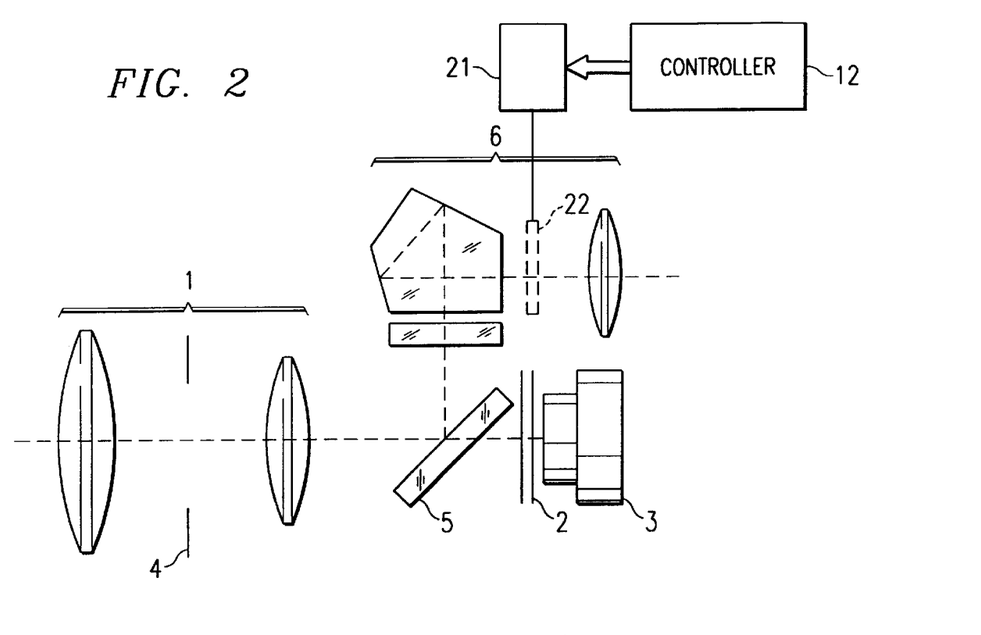
FIG. 2 is a diagram showing a construction of a photographing portion of the first still video camera.

Referring now to FIG. 2 showing a construction of the photographing portion, the checking of the image quality deterioration of compressed image data will be described later. As shown in FIG. 2, an optical member 22 is insertably provided in the optical path of the viewfinder system 6. The optical member 22 includes at, least a spatial low-pass filter or a light diffusion filter.

When checking compressed image data, the controller 12 drives an actuator 21 to insert the optical member 22 in the optical path, so that a compressed image data having a reduced high frequency components or a degraded S/N ratio can be displayed in the viewfinder system 6. Accordingly, the photographer can visually check the degree of image quality deterioration caused by the compression. For the spatial low-pass filter may be used a birefringent low-pass filter having crystal or the like, or a phase-type low-pass filter utilizing diffraction effect.

Also, a plurality of insertable low-pass filters may be provided to enable the photographer to select an appropriate one among a plurality of compression ratios. For example, three insertable low-pass filters having their respective different cutoff frequencies are provided for three compression ratios. In this case, a low-pass filter which has lower cutoff frequency corresponds to a compressed image having greater compression ratio. Alternatively, to provide three compression ratios, it is possible to use two insertable low-pass filters having their respective different cutoff frequencies. Specifically, there is provided one low-pass filter A and the other low-pass filter B which has higher cutoff frequency than the one low-pass filter A. By using these low-pass filters A and B can provide three compression ratios, specifically, a highest compression ratio provided by a combination of the filters A and B, an intermediate compression ratio provided by the filter A, and a lowest compression ratio provided by the filter B.

In this embodiment, a spatial low-pass filter or light diffusion filter is inserted in the optical path of the viewfinder system 6. However, such a filter may be inserted in the optical path of the photographic lens 1 when checking the compressed image data to be stored, in other words, when photography is not executed.

Also, in the above embodiment, the viewfinder system 6 is in the form of an optical viewfinder. However, an electronic viewfinder, e.g., a liquid crystal display device, may be used if it has a necessary resolution. A spatial low-pass filter or light diffusion filter is inserted in the optical path of the electronic viewfinder.

Figure 3:
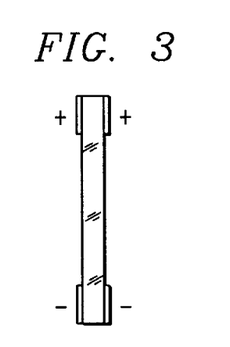
FIG. 3 is a side view of an optical member provided in the first still video camera.

The following are another examples for the optical member 22. FIG. 3 shows a piece made of lead lanthanum zirconate titanate, i.e., PLZT, which has an electrooptical effect of varying its birefringence with the electric field applied. This birefringence effect enables the PLZT piece to perform substantially the same function as a spatial low-pass filter. The optical element 22 of PLZT can be kept at a fixed position. The voltage (or electric field) applied to the PLZT optical element 22 is changed according to the compression ratio and compression way to change its birefringence, in other words, change the cutoff frequency.

Also, in place of the material having the electrooptical effect, an ultrasonic optical polarizer material can be used for the optical member 22. In this case, the refraction index variation is utilized as diffraction. The refraction index is acoustooptically changed. This diffraction enables the ultrasonic optical polarizer material to perform substantially the same function as a spatial low-pass filter. The angle of diffracted light beam can be changed by altering the frequency of high frequency sine wave signal to be applied to the ultrasonic optical polarizer material. As ultrasonic optical polarizer material, there are known fused quartz, diarsenic disulfide, etc. In this case, the frequency of high frequency sine wave signal applied to the ultrasonic optical polarizer member 22 is changed according to the compression ratio and compression way to change the angle of diffraction, in other word, change the cutoff frequency.

Further, in place of the ultrasonic optical polarizer material can be used a material having an electrooptical light scattering effect. In this material, the degree of scattering is changed by applying different voltages. As the electrooptical light scattering material has been known PLZT, etc. The voltage to be applied to the electrooptical light scattering member is changed according to the compression ratio and compression way to,change the degree of scattering, consequently produce an image with a desired high frequency component being reduced, or with its S/N ratio being degraded to a desired value.

Figure 4:
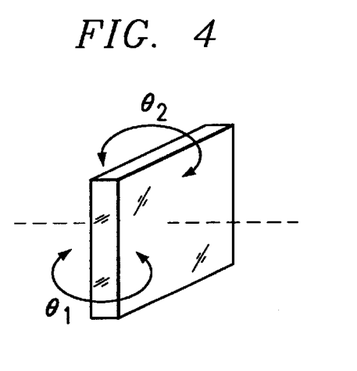
FIG. 4 is a perspective view of the optical member.
Figure 5:
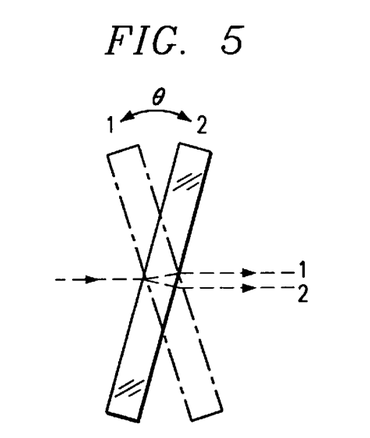
FIG. 5 is a diagram showing turning of the optical member.

Furthermore, a part of the photographic optical system or the viewfinder optical system is wiggled at a high frequency, e.g., at a frequency of 50 Hz, to produce a multitude of images, which consequently provide an image identical to that provided by a spatial low-pass filter. For example, a plane parallel plate made of transparent glass or plastics is used as the optical member 22, and is arranged so as to reciprocatingly turn at small turning angles in the directions of θ1 and θ2 as shown in FIG. 4. The small reciprocating turning of the plate causes a light beam to oscillate as shown in FIG. 5, so that a double image is produced. FIG. 5 illustrates a turning about a vertical axis of the Plate.

Figure 6:
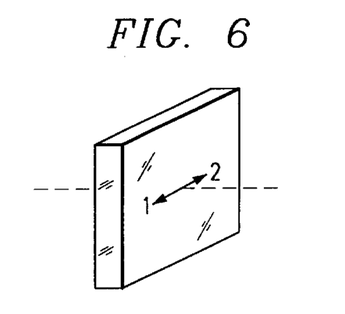
FIG. 6 is a diagram showing a first oscillation of a light beam being transmitted through the optical member.
Figure 7:
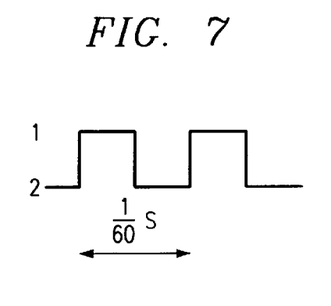
FIG. 7 is a diagram showing a signal for driving the optical member.

FIG. 6 illustrates a state in which the light beam oscillates between positions "1" and "2" by reciprocatingly turning the plate about the vertical axis. FIG. 7 shows a signal for causing the small reciprocating turning of the plate. In this case, the plate is turned so that the light beam oscillates between the positions "1" and "2" at an interval of $1/120$ second. Utilizing the so-called after-image effect of human eyes, the image can be obtained which is free from flickering and is equivalent to that of a spatial low-pass filter. It should be noted that to eliminate flickering, the dwell time at the position "1" or "2" must be shorter than $1/50$ second. The functional characteristic of spatial low-pass filter is changed by changing the oscillating amount of light beam. Accordingly, the oscillating amount of light beam is changed in accordance with the compression ratio and compression, way so as to produce an image corresponding to the compressed image data.

Figure 8:
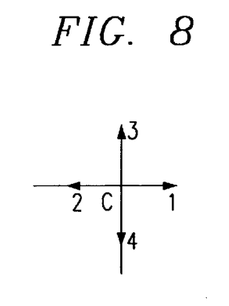
FIG. 8 is a diagram showing a second oscillation of a light beam being transmitted through the optical member.
Figure 9:
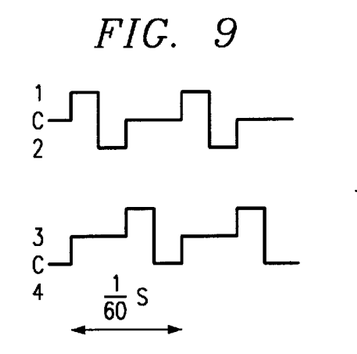
FIG. 9 is a diagram showing driving signals for causing the second oscillation.

In FIGS. 5 and 6, the plate is rieciprocatingly turned only about the vertical axis so that, the light beam oscillates only in a horizontal plane. However, as shown in FIG. 8, the plate may be reciprocatingly turned about both a vertical axis and a horizontal axis so that the light beam oscillates in horizontal and vertical, planes to attain horizontal and vertical spatial low-pass filter functions. FIG. 9 shows signals for causing horizontal and vertical turning of the plate. Also, there may be separately provided one driver for the horizontal turning and another driver for the vertical turning.

Figure 10:
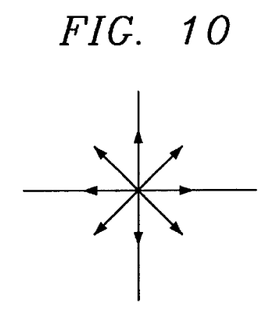
FIG. 10 is a diagram showing a third oscillation of a light beam being transmitted through the optical member.

In this case, firstly, the plate is reciprocatingly turned about the vertical axis, i.e., in the directions of θ1 in FIG. 6, so that the light beam ioscillates in the horizontal plane, i.e., between positions "1" and "2" in FIG. 10. In this time, the plate is not turned about the horizontal axis, i.e., in the directions of θ2 in FIG. 6. Accordingly, the light beam stays at the central position "c" in respect of the vertical plane, i.e., between positions "3" and "4". Next, the plate is reciprocatingly turned in the directions of θ2 in FIG. 6, so that the light beam oscillates in the vertical plane, i.e., between positions "3" and "4" in FIG. 10. In this time, the plate is not turned in the directions of θ1 in FIG. 6. Accordingly, the light beam stays at the central position "c" in respect of the horizontal plane.

Further, the plate may be reciprocatingly turned about inclined axes as shown in FIG. 10 to attain the spatial low-pass filter function in inclined directions.

Figure 11:
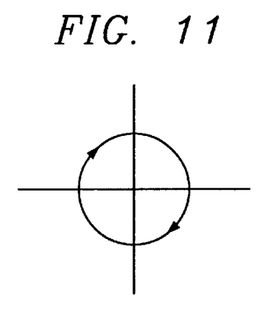
FIG. 11 is a diagram showing a fourth oscillation of a light beam being transmitted through the optical member.

Moreover, the plate may be reciprocatingly turned in circular directions as shown in FIG. 11 so as to obtain the spatial low-pass filter function.

In the above-mentioned oscillations, the plane parallel plate is reciprocatingly turned. Alternatively, a medium having a variable refraction index is provided in the photographic optical system or the viewfinder optical system with being inclined relative to the optical path of the system. The refraction index of the medium is changed so that the light beam oscillates. Furthermore, the light beam oscillation can be attained by vibrating the mirror 5 of the viewfinder optical system.

Figure 12:
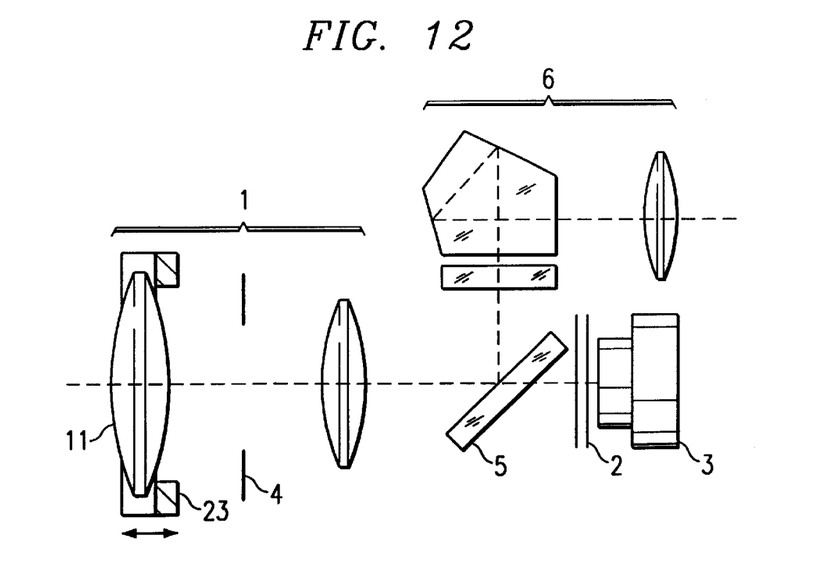
FIG. 12 is a diagram showing a construction of another photographing portion.

FIG. 12 shows another means for producing an image corresponding to an compressed image data in the viewfinder optical system. In this case, a part of the photographic optical system, or a part of the viewfinder optical system is moved so as to produce a defocused image in the viewfinder. The defocus amount is changed in accordance with the compression ratio and compression way so that the photographer can observe the compressed image data. However, it is needless to say that the photographic optical system is brought in focus when photography is practiced.

As an example of moving a part of the photographic optical system, a focussing ring of the photographic lens 1 is rotated. Alternatively, as shown in FIG. 12, a piezoelectric device 23 is provided on the periphery of a focussing lens 1f of the photographic lens 1 to move the focussing lens 1f without connection with a usual focussing driver.

Figure 13:
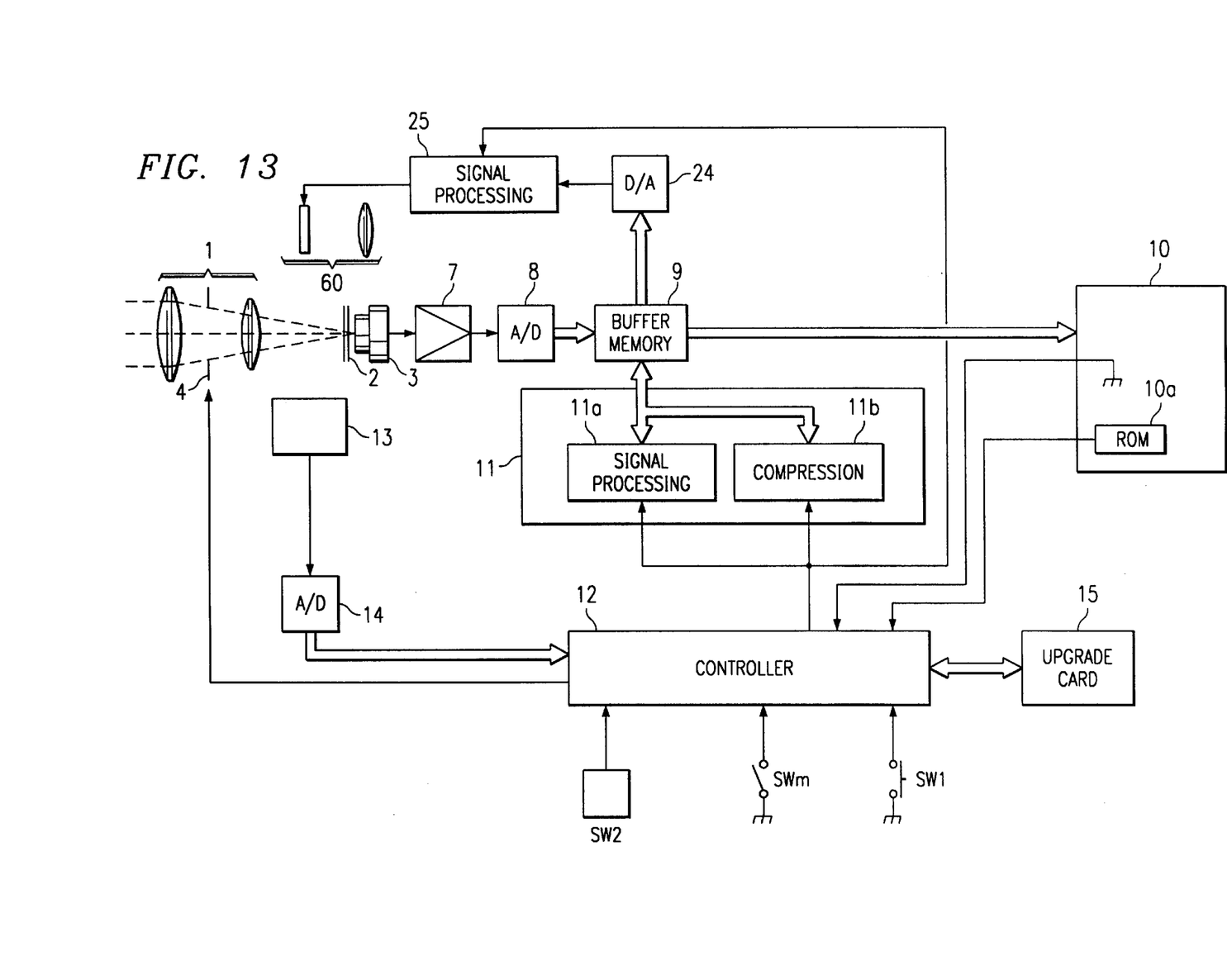
FIG. 13 is a block diagram showing an overall construction of a second still video camera of the present invention.

FIG. 13 is a block diagram showing an overall construction of a second still video camera of the present invention. This embodiment is basically identical to the first still video camera except for using an electronic viewfinder 60 as a viewfinder system. Accordingly, the same reference numerals are given to like parts to omit description of the parts. An output of the image pick-up device 3 is processed through an A/D converter 8, buffer memory 9, D/A converter 24 and signal processing circuit 25, and sent in the form of an image signal to the electronic viewfinder 60 in which the photographed image is displayed.

It is usual that an electronic viewfinder includes a reduced number of picture elements for the need of compactness. Such a reduced number of picture elements cannot provide a high resolution. Accordingly, even if a compressed image is merely displayed in the electronic viewfinder 60, the photographer cannot observe how the picture quality will be deteriorated by the compression.

To overcome the above-mentioned problem, it has been known that high frequency components of a subject are distinguished by emphasizing contours off the subject. In this embodiment, the degree of emphasizing is changed in accordance with the compression ratio and compression way so as to change the quality of image. Accordingly, the photographer can check an image quality deterioration caused by the compression.

Figure 14:
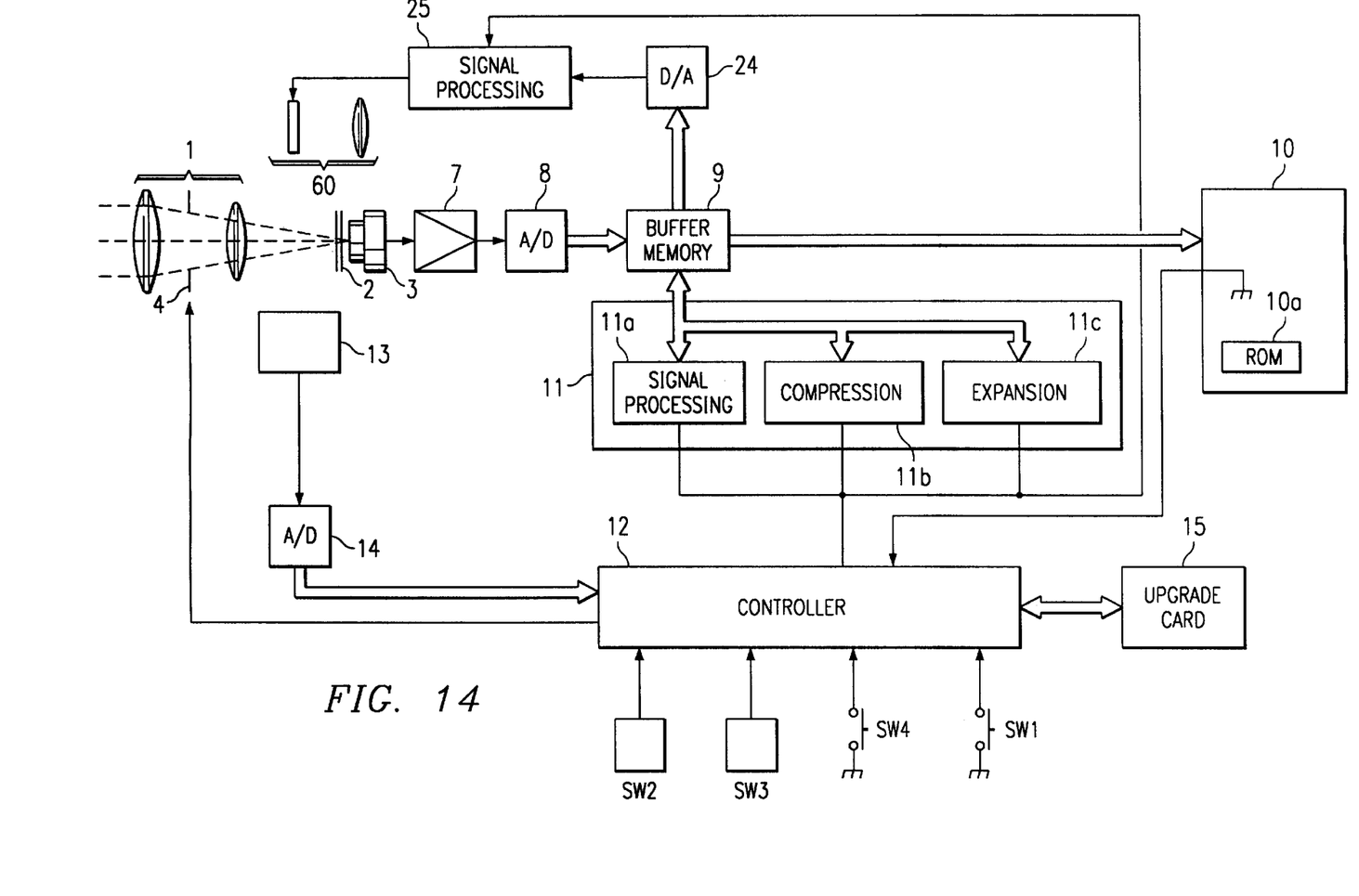
FIG. 14 is a block diagram showing an overall construction of a third still video camera of the present invention.

FIG. 14 is a block diagram showing an overall construction of a third still video camera of the present invention. This embodiment is basically identical to the first still video camera except for that an electronic viewfinder 60 is used as a viewfinder system, and a portion of the compressed image is expanded and displayed in the electronic viewfinder 60 so that the photographer can observe the image quality deterioration based on the expanded image. Like parts are given the same reference numerals as the first still video camera.

A subject is photographed on an image pick-up device 3 by turning on a release switch SW1. The image pick-up device 3 converts the light from the subject to an electrical charge. The charge is amplified in an amplifier 7 and converted into a digital signal by an A/D-converter 8. The converted signal is stored in a buffer memory 9. The signal further undergoes signal processing and compression, and finally stored in a memory card 10.

In this embodiment, the compressed signal is expanded in an expansion circuit 11c, and converted into an analog signal in a D/A-converter 24, and processed by a signal processing circuit 25, and finally displayed in the electronic viewfinder 60.

A display switch SW3 is provided to enable the photographer to selectably turn on and off the display of a processed image in the electronic viewfinder 60. Also, the turning on and off of display may be executed by actuating a compression ratio change switch SW2.

In the electronic viewfinder 60 is displayed an image corresponding to a compression ratio set by the compression ratio change switch SW2. While observing an image displayed in the electronic viewfinder 60, the photographer can select a compression ratio suitable for his photographic purpose. When a storing switch SW4 is turned on, a controller 12 start storing the image data corresponding to the selected compression ratio in the memory card 10. When the storing switch SW4 is not turned on, the instant image displayed in the electronic viewfinder 60 is stored in the memory card 10 or canceled after the lapse of a predetermined time after the release switch SW1 is turned on, or the compression ratio change switch SW2 is turned on. Also, a modification is possible in which the storing switch SW4 is not provided, and the release switch SW1 is given the function of the switch SW4 in addition to the original function of the release switch SW1. Specifically, the release switch SW1 permits the execution of the photography in a first turning on and then permits the execution of the image storing in a second turning on.

As mentioned above, the number of picture elements of the electronic viewfinder 60 is insufficient to clearly display an image to be stored. A portion of the image is expanded and the partial expanded image is displayed in the electronic viewfinder 60 so as to display the quality of image to be stored in more detail. Accordingly, the photographer can more accurately observe the quality of image to be stored based on the partial expanded image.

Also, the characteristics of an electrical low-pass filter or the S/N ratio may be changed by changing the signal processing manner according to the compression ratio and compression way in the digital or analog signal processing circuit.

Figure 15A:
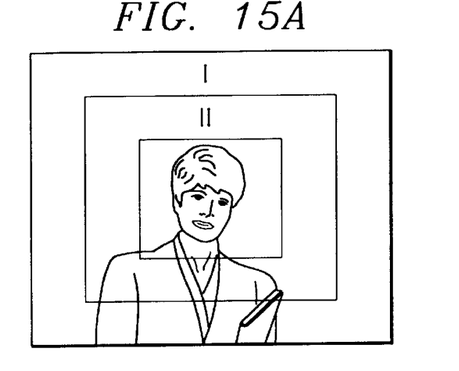
FIGS. 15A, 15B, and 15C are diagrams showing an expansion of a compressed image in an electronic viewfinder.
Figure 15B:
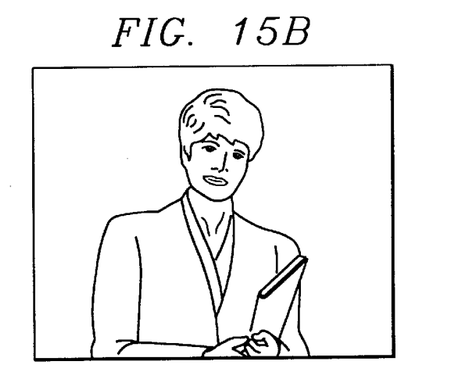
Figure 15C:
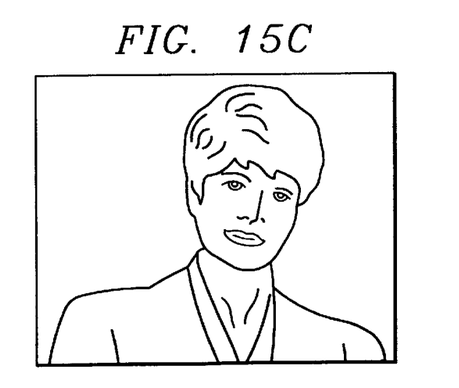

FIGS. 15A, 15B, and 15C show an expansion manner of a portion of an image to be displayed in the electronic viewfinder 60. The expansion ratio can be changed. Specifically, a portion of the image of FIG. 15A is expanded into an image of FIG. 15B at an expansion ratio I, and into an image of FIG. 15C at an expansion ratio II.

Figure 16:
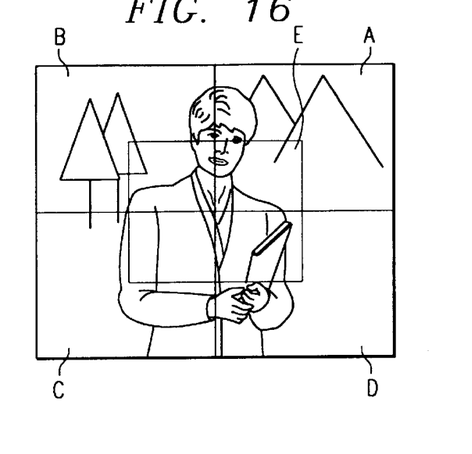
FIG. 16 is a diagram showing another expansion of a compressed image in an electronic viewfinder.

FIG. 16 shows another expansion manner in which an expanding portion is selected from five zones A, B, C, D, and E. This expansion manner facilitates the observation of image quality deterioration.

Figure 17:
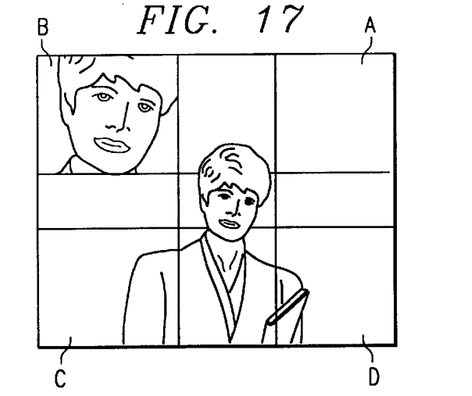
FIG. 17 is a diagram showing yet another expansion of a compressed image in an electronic viewfinder.

FIG. 17 shows another expansion manner which enables the photographer to select a position, for displaying an expanded image. Specifically, in the illustration, a center portion of the image is an expanding portion. The zone B is selected as displaying position by the photographer. Accordingly, the expanded center portion is displayed in the zone B.

In the above-mentioned embodiments, the memory card 10 is provided with the ROM 10a for storing information concerning image data compression, such as the storage capacity. Alternatively, instead of the ROM 10a, a switch 16 for setting the compression ratio may be provided on a memory card 10 as shown in FIG. 18.

Figure 18:
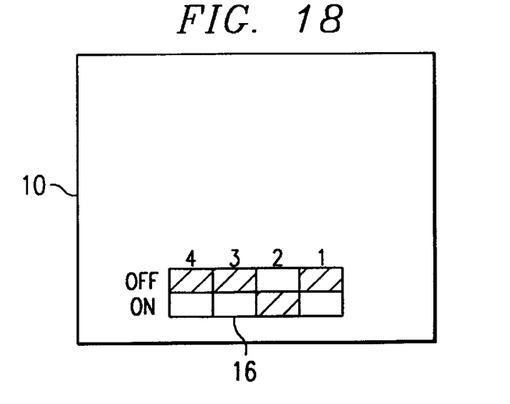
FIG. 18 is a diagram showing another memory card.

In FIG. 18, the switch 16 includes a 4-segment DIP switch. The DIP switch 16 produces a 4-bit compression ratio signal. In the illustration, the shaded portion shows the present state of each of the four witch segments. The ON and OFF states of each segment denote the logic values "1" and "0" respectively. The setting of FIG. 18 produces an output signal "0010". By expressing the number N of the compression ratio 1/N by a 4-bit notation, sixteen kinds of compression ratio, i.e., 1/1 to 1/16, can be set by the switch 16. For example, the value "0010" represents a compression ratio of 1/2. Also, by assigning given sixteen compression ratios to sixteen 4-bit notations, a desired compression ratio can be set in a shorter time.

Also, in the above-mentioned embodiments, a digital image data consisting of a luminance signal (Y) and color difference signals (R-Y and B-Y) are compressed, and stored in the memory card 10. Alternatively, a digital signal issued from the A/D converter 8 may be compressed by a compression circuit and stored in the memory card 10. In this case, when reproducing the compressed image stored in the memory card 10, the compressed image data is read out together with administrative data such as compression ratio from the memory card 10, and then expanded by an expander (not illustrated) at an expansion ratio corresponding to the compression ratio. The expanded digital image data is sent to the signal processing circuit 11a of the digital processing circuit 11 in which color separation, gamma correction, white balance adjustment, matrix processing, and NTSC encoding for TV are practiced.

Furthermore, in the above-mentioned embodiments, an output from the image pick-up device 3 is A/D converted before the signal processing. Alternatively, before executing A/D- conversion, an output from the image pick-up device 3 may be processed in the form of an analog signal by color separation, gamma correction, white balance adjustment, matrix processing, and finally NTSC encoding for TV. The processed signal is then A/D-converted, and compressed, and stored in the memory card 10.

Although the present invention has been described with reference to the examples of preferred embodiments thereof, it is to be understood that various changes and modifications will be apparent to those skilled in the art. Therefore, unless such changes and modifications depart other than from the scope of the present invention, they should be construed as being included therein.

What is claimed is:

1. A camera for use with a memory medium detachably attachable to said camera, said memory medium being capable of storing compressed image data and information to be used for image data compression, said camera comprising:

(a) an image sensor which senses an image of an object and produces image data;

(b) a connector which connects the memory medium to the camera in order to read out the information from said memory medium;

(c) a processor which automatically sets a compression ratio based on the read-out information; and (d) a data processor which compresses the image data produced by the image sensor at the set compression ratio.

2. A camera as claimed in claim 1, wherein said camera further comprises a varying device which varies the compression ratio which is to be set by said processor.

3. A camera as claimed in claim 1, wherein said processor sets the compression ratio when said memory medium is attached to said camera.

4. A camera as claimed in claim 1, wherein said memory medium includes a setting device which sets a compression ratio.

5. A camera as claimed in claim 1, wherein the information is information about the storage capacity of said memory medium.

6. A camera as claimed in claim 1, wherein the information is a compression ratio.

7. A camera as claimed in claim 1, wherein said processor sets the compression ratio when the camera is actuated to start its operation.

8. A camera system comprising:

(a) a camera main body;

(b) an image sensor which senses an image of an object and produces image data, said image sensor being provided in said camera main body;

(c) a storing medium detachably attached to the camera main body, and including:
first storing means for storing information to be used for compression, and
second storing means for storing compressed image data;

(d) a connector which connects the storing medium to the camera main body in order to read out the information stored in said first storing means;

(e) a processor which automatically sets a compression ratio based on the read out information; and (f) a data processor which compresses the image data produced by the image sensor at the set compression ratio.

9. A camera system as claimed in claim 8, further comprising a varying device which varies the compression ratio which is to be set by said processor.

10. A camera system as claimed in claim 8, wherein said processor sets the compression ratio when said storing medium is attached to the camera main body.

11. A camera system as claimed in claim 8, wherein said information to be used for compression is information about the storage capacity of said second storing means.

12. A camera system as claimed in claim 8, wherein said information to be used for compression is a compression ratio.

13. A camera system as claimed in claim 8, wherein said storing medium includes a setting device which sets a compression ratio.

14. A camera system as claimed in claim 8, wherein said processor sets the compression ratio when the camera system is actuated to start its operation.

15. A camera comprising:
  an image sensing means for sensing an image of an object and producing image data;
  compression means for compressing the image data;
  setting means for setting a compression ratio for said compression means;
  displaying means for displaying an image which is provided without using the compressed image data but which has an equivalent image quality of the image data having undergone compression, said displaying means including a mechanism for changing the quality of the displayed image in proportion to the set compression ratio; and
  storing means for storing the compressed image data.

16. A camera as claimed in claim 15, further comprising a main body carrying said image sensing means, wherein said storing means is detachably attached to the main body.

17. A camera as claimed in claim 15, wherein said displaying means includes an electronic viewfinder for displaying the image.

18. A camera as claimed in claim 15, wherein said mechanism includes a filter for decreasing the quality of the displayed image in proportion to the set compression ratio.

19. A camera as claimed in claim 15, wherein said mechanism includes a medium having variable refractive index thereof, and varying means for varying the refractive index of said medium in proportion to the set compression ratio.

20. A camera as claimed in claim 15, further comprising an optical system, and wherein said displaying means includes means for displacing said optical system.

21. A camera as claimed in claim 15, further comprising means for expanding a portion of an image representative of the image data having undergone compression, wherein said displaying means displays the expanded portion.

22. A system comprising:
  first storing means for storing image data;
  compression means for compressing the image data;
  setting means for setting a compression ratio for said compression means;
  displaying means for displaying an image which is provided without using the compressed image data but which has an equivalent image quality of the image data having undergone compression, said displaying means including a mechanism for changing the quality of the displayed image in proportion to the set compression ratio; and
  second storing means for storing the compressed image data.

23. A system as claimed in claim 22, wherein said system includes:
  a camera body; and
  an image storing medium detachably attachable to the camera body;
  said camera body carrying said first storing means, said compression means, said setting means, and said displaying means; and
  said image storing medium carrying said second storing means.

24. A camera system comprising:
  (a) a camera main body;
  (b) a storing medium detachably attached to the camera main body, and including:
    first storing means for storing information to be used for compression of image data, and
    second storing means for storing compressed image data;
  (c) a connector which connects the storing medium to the camera main body in order to read out the information stored in said first storing means;
  (d) a processor which automatically sets a compression ratio based on the read out information; and
  (e) a data processor which compresses image data at the set compression ratio.

25. A system comprising:
  (a) a main body;
  (b) a storing medium detachably attached to the main body, and including:
    first storing means for storing information to be used for compression of image data, and
    second storing means for storing compressed image data;
  (c) a connector which connects the storing medium to the main body in order to read out the information stored in said first storing means;
  (d) a processor which automatically sets a compression ratio based on the read out information; and
  (e) a data processor which compresses image data at the set compression ratio.

26. A camera for use with a memory medium detachably attachable to said camera, said memory medium being capable of storing compressed image data and information to be used for image data compression, said camera comprising:
  (a) a connector which connects the memory medium to the camera in order to read out the information from said memory medium;
  (b) a processor which automatically sets a compression ratio based on the read out information; and
  (c) a data processor which compresses image data at the set compression ratio.

27. A device for use with a memory medium detachably attachable to said device, said memory medium being capable of storing compressed image data and information to be used for image data compression, said device comprising:
  (a) a connector which connects the memory medium to the device in order to read out the information from said memory medium;
  (b) a processor which automatically sets a compression ratio based on the read out information; and
  (c) a data processor which compresses image data at the set compression ratio.

28. Apparatus comprising a controller which is suitable for association with a first memory having image data stored therein, a digital processor for compressing image data received from said first memory, and a display means; said controller having capabilities of:

receiving information and setting a set compression ratio for compression of said image data received from said first memory responsive to thus received information;

controlling said digital processor so as to effect compression of the image data, received from said first memory, at the set compression ratio;

causing said display means to display an image without using the compressed image data but which has an equivalent image quality of the image data having undergone compression; and controlling said display means so as to change a quality of the displayed image in proportion to the set compression ratio.

29. Apparatus in accordance with claim 28, wherein said digital processor has an ability for processing of image data received from said first memory for at least one of color separation, gamma correction, white balance adjustment, and matrix processing to produce Y, R-Y, and B-Y signals, as well as being able to compress the thus processed image data; and wherein said controller has a further capability of controlling said digital processor so as to control said processing of image data received from said first memory.

30. Apparatus in accordance with claim 28, further comprising said first memory, said digital processor, and said display means.

31. Apparatus in accordance with claim 28, wherein said controller is suitable for association with a second memory for storing thus compressed image data, wherein the capability of receiving information comprises the capability of receiving the information from the second memory, and wherein said controller has the further capability of causing compressed image data to be transmitted to said second memory for storage in said second memory.

32. Apparatus in accordance with claim 31, further comprising said first memory, said digital processor, and said display means.

33. Apparatus comprising:

a controller, said controller having capabilities for:
receiving information and setting a compression ratio responsive to thus received information;
controlling a reading of stored image data from a first storing means;
controlling a compressing of thus read image data at thus set compression ratio;
controlling a displaying of an image representative of thus compressed image data without using the thus compressed data, wherein the image representative of the compressed image data changes according to the compression ratio and
controlling a storing of said compressed image data in a second storing means.

34. Apparatus comprising a device which is suitable for association with a first memory having image data stored therein, a digital processor for compressing image data received from said first memory, and a display means; said device having capabilities for effecting:

a receipt of information and a setting of a set compression ratio for compression of said image data received from said first memory responsive to thus received information;

a controlling of said digital processor so as to effect compression of the image data, received from said first memory, at the set compression ratio;

a display by said display means of an image without using the compressed image data but which has an equivalent image quality of the image data having undergone compression; and a controlling of said display means so as to change a quality of the displayed image in proportion to the set compression ratio.

35. Apparatus comprising:

a device, said device having capabilities for:
effecting a receiving of information;
effecting a setting of a compression ratio responsive to thus received information;
effecting a reading of stored image data from a first storing means;
effecting a compressing of thus read image data at thus set compression ratio;
effecting a displaying of an image representative of thus compressed image data without using the thus compressed image data, wherein the image representative of the compressed image data changes according to the compression ratio and
effecting a storing of said compressed image data in a second storing means.

* * * * *